United States Patent [19]
Pesiri

[11] 4,067,613
[45] Jan. 10, 1978

[54] ARM REST AND MOUNTING BRACKET THEREFOR

[75] Inventor: James B. Pesiri, Dana Point, Calif.

[73] Assignee: J. C. Sales & Mfg. Co., Inc., Irwindale, Calif.

[21] Appl. No.: 779,315

[22] Filed: Mar. 21, 1977

[51] Int. Cl.² ........................... A47C 7/54; B60N 3/02
[52] U.S. Cl. ..................................... 297/416; 297/417
[58] Field of Search .............................. 297/115–117, 297/416, 417; 403/117, 349, 348, 353, 113, 116

[56] References Cited

U.S. PATENT DOCUMENTS

| 2,661,227 | 12/1953 | Murphy | 297/416 X |
| 3,357,740 | 12/1967 | Vaughn et al. | 297/416 |
| 3,807,799 | 7/1974 | Freedman | 297/417 |

Primary Examiner—James C. Mitchell
Attorney, Agent, or Firm—Edward J. DaRin

[57] ABSTRACT

An arm rest carrying a rotatable element having a stop member for mounting it in a horizontal arm-resting position. The arm rest is utilized with a universal bracket permitting it to be readily secured therein and rotated between a horizontal and a vertical position.

15 Claims, 6 Drawing Figures

U.S. Patent     Jan. 10, 1978     4,067,613
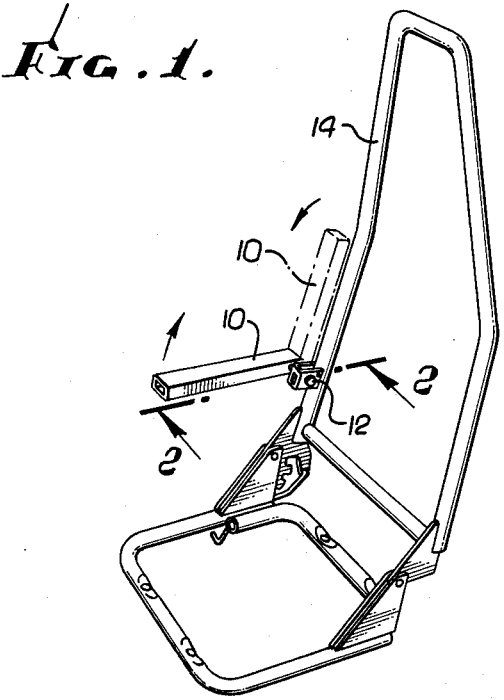
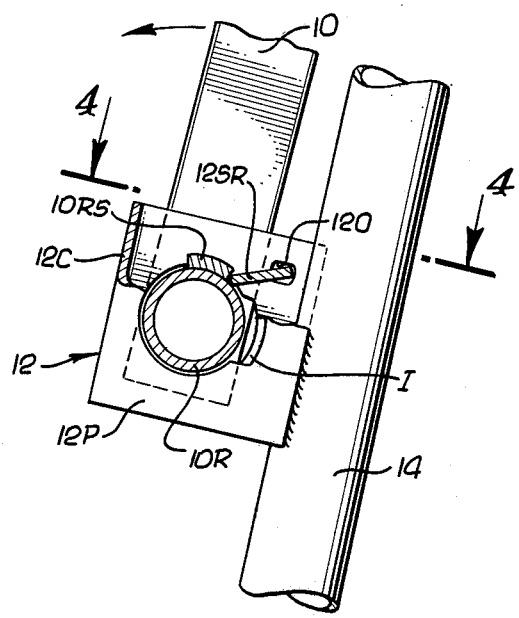
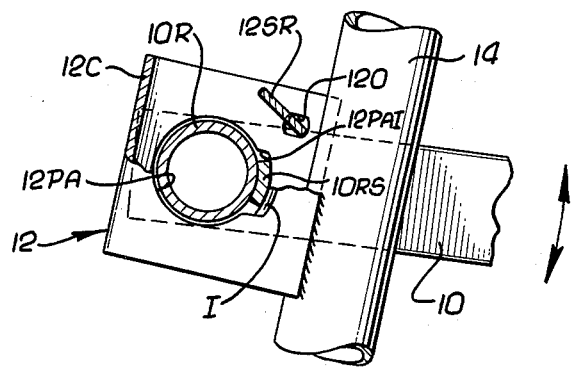
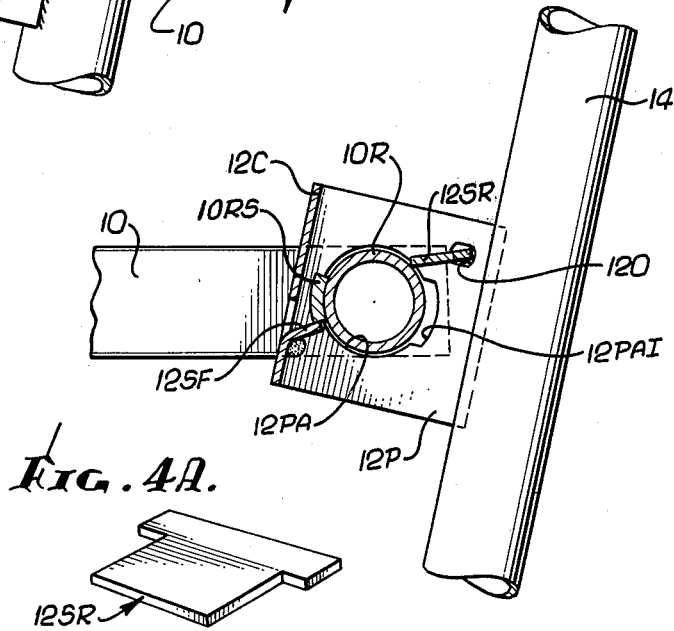
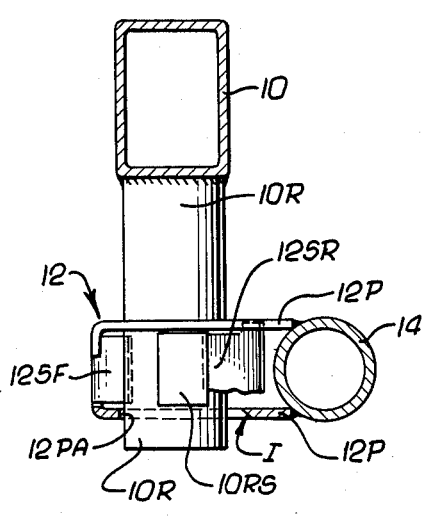
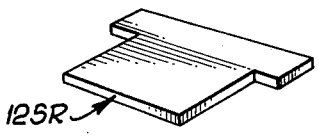

ARM REST AND MOUNTING BRACKET THEREFOR

PRIOR ART AND SUMMARY OF THE INVENTION

This invention relates to an arm rest for a chair seat, or the like, adapted to be secured to a frame for a seating structure and a mounting bracket therefor.

Various types of seating structures are presently employed in motor vehicles such as trucks, vans, buses and motor homes. There is at the present time a substantial use of recreational vehicles such as vans and motor homes. The seating structures for recreational vehicles are generally provided with auxiliary devices and seats such as reclining seats, arm rests, etc. after they are received from the original equipment manufacturer. The arm rests presently used in such recreational vehicles may have an arm rest for either the left or the right arm, or for both arms, in accordance with the manner the seating structure is positioned or arranged in the vehicle. Some present day arm rests are movable from an arm resting position to a non-resting position to permit an individual to slide in and out of the seat with a minimum of effort. These arm rests are generally adapted to be secured to the frame for the seating structure so as to permit the frames and any arm rest secured thereto to be readily upholstered to provide a suitable comfortable seating structure. One of the problems of present day arm rest structures is that the arm rests proper may be detached from its mounting structure by being pushed out by the fabric.

The present invention provides an improved, inexpensive and relatively trouble-free universal arm rest and universal mounting bracket that can be very quickly installed on a seating structure with a minimum of expense and labor. The arm rest of the present invention may also be readily removed from its seating structure and is adapted to be swung between the horizontal, arm resting position into a vertical non-resting position while still being safely secured to its mounting bracket on the seating structure. The arm rest may be readily secured to its seating structure and cannot be pushed out of its mounting position by the fabric and will not interfere with the normal upholstering operation or comfort of the seat.

From a structural organizational standpoint, the arm rest and the mounting bracket therefor for the present invention comprehends the arm rest having an element of an L-shaped configuration with the long arm of the "L" adapted as a rest for an individual's arm and the short arm of the L-shaped element being defined by a rotatable element having a stop member secured on the outer wall of the element adjacent the free end thereof. The stop member is located for maintaining the long arm of the L-shaped element in a horizontal position when it is secured to a bracket for supporting it in an arm resting relationship. The bracket for the arm rest comprises a U-shaped element having a pair of coaxial apertures constructed and defined in the parallel arms of the U-shaped element for slidably receiving the rotatable element for the L-shaped arm resting structure and the stop member secured thereto. The coaxial apertures are provided with a configuration corresponding to the outer configuration of the rotatable element at the stop member to allow the rotatable element for the arm resting or L-shaped element to be slipped therein. The parallel arms of the U-shaped element are spaced apart a distance for permitting the rotatable element for the L-shaped element to be rotated in the coaxial apertures with the stop member being freely rotated between the arms. The arm of the U-shaped element connecting the parallel arms has a stop member defined thereon and adapted to extend inwardly between the parallel arms for engaging and arresting the stop member on the tubular element and at a location for holding the L-shaped element in the horizontal arm resting position. The mounting bracket may also include another stop means secured thereto and arranged adjacent the coaxial apertures in a pivotable relationship with respect to the stop member for the rotatable element of the arm rest. The additional stop member permits the rotatable element to be rotated away from its horizontal arm resting position to a substantially vertical nonresting position and moved freely back to the arm rest position. The additional stop member prevents rotation of the arm resting position beyond the vertical position but is movable or tiltable out of the path of the rotatable element to allow the arm rest to be readily removed from its mounting bracket.

These and other features of the present invention may be more fully appreciated when considered in the light of the following specification and drawings, in which:

FIG. 1 is a perspective view of a frame for a seating structure illustrating the arm rest and mounting bracket secured thereto in a horizontal, arm-resting position and a nonresting position being illustrated in dotted outline, and embodying the present invention;

FIG. 2 is a cross-sectional view of the arm rest and bracket, with portions broken away, taken along the line 2—2 of FIG. 1;

FIG. 3 is a partial elevational view, with portions broken away, of the arm rest arranged in a vertical or nonresting position;

FIG. 4 is a sectional view taken along the line 4—4 of FIG. 3;

FIG. 4A is a perspective view of the detached stop element provided for the mounting bracket; and FIG. 5 is an elevational view, with portions in section, illustrating the initial mounting position for mounting the arm rest in its mounting bracket.

Now referring to the drawings, the arm rest 10 and its mounting bracket 12 embodying the present invention will be described in detail. The arm rest 10 and the mounting bracket 12 are illustrated in FIG. 1 secured to a seating grame for a reclinable seating structure which is generally identified by the reference numeral 14. The seating frame structure 14 per se is the subject of my copending patent application bearing Ser. No. 772,634 and reference may be had to that disclosure if necessary. It will, of course, be understood that the arm rest 10 and the bracket 12 may be secured to any other form of seating structure. The bracket 12 is illustrated in FIG. 1 as being secured to the frame 14 by welding and securing the arm rest 10 in a horizontal arm resting position. The other position of the arm rest 10, or the nonresting position, is denoted in dotted outline in FIG. 1. The arm rest 10 is freely rotatable while being securely mounted to the bracket 12 between the arm resting position and the nonresting position.

The arm rest 10 is illustrated in the drawing as being of a hollow, rectangular construction having a preselected length in accordance with the seating structure with which it is utilized for providing a comfortable arm rest. The structure itself, however, may take various forms such as a flat plate, L-shaped configuration or any other suitable configuration that may be readily upholstered to provide a comfortable arm rest. The arm resting structure per se is provided with a rotatable element illustrated as the tubular element 10R extending outwardly therefrom at approximately 90°. The rotatable element 10R may be secured to the arm resting structure 10 proper by being welded adjacent one end thereof. The tubular element 10R carries a stop member 10RS secured adjacent the free end of the tubular element 10R. The stop member 10RS may be secured in the desired position by welding and have a rectangular configuration of a preselected width. The stop member 10RS is secured to the tubular element 10R at a location to arrest movement of the arm rest 10 in a horizontal, arm-resting position when it is rotated in the mounting bracket 12 for this purpose. The arrangement of the rotatable element 10R and its stop member 10RS relative to the rectangular arm rest 10 can be best appreciated from examining FIG. 4.

The mounting bracket 12 comprises a U-shaped element having a pair of parallel arms 12P connected by a base element on a connecting arm of the "U" and which arm is identified in the drawings by the reference numeral 12C. The parallel arms 12P of the U-shaped bracket 12 are each provided with an aperture 12PA and which apertures are coaxially aligned to receive and accommodate the rotatable element 10R of the arm rest 10. The configuration of the coaxial apertures 12PA for accepting the rotatable element 10R are of a generally circular configuration along with a segment 12PAI of increased diameter to receive the stop element 10RS in a slidable relationship therewith, as best illustrated in FIG. 5. The walls of the arms 12P defining the segments 12PAI are inclined inwardly to facilitate the entry of the stop member 10RS therein. This is identified in FIGS. 3 and 4 by the letter "I". The parallel arms 12P are spaced apart a distance to allow the element 10R to be rotated therein with the stop member 10RS freely moving between the parallel arms 12P. The connecting arm 12C of the U-shaped bracket 12 is provided with a stop member 12SF constructed and defined therein. The stop member 12SF may be constructed integrally with the U-shaped bracket 12 and formed by deforming the arm 12C to provide a portion of the deformed metal to extend inwardly between the parallel arms 12P. The deformed portion of the metal forming the stop member 12SF may then be strengthened by means of a weld as is evident from examining FIG. 2. The location of the stop member 12SF is selected to maintain the arm rest 10 in a horizontal position when it is in engagement with the stop element 10RS for the rotatable element 10R; see FIG. 2.

The mounting bracket 12 includes a further stop element which is arranged in a location approximately diametrically opposite to the position of the stop element 12SF. This additional stop element is identified by the reference numeral 12SR and is pivotally secured between the arms 12P of the bracket 12 and extends inwardly thereof. The stop member 12SR has a generally T-shaped configuration, as illustrated in FIG. 4A, and is pivotably secured in the openings 120 arranged adjacent the top rear section of each of the arms 12P, as illustrated in FIG. 4. The free ends of the bridging arm of the "T" structure for the stop member 12SR are of a rectangular configuration and positioned within the apertures 120 for restricted pivotal movement therein. This allows the tongue of the stop member 12SR to pivotally move between the parallel arms 12P for the bracket 12. The pivoting action is such that the counter-clockwise rotation of the element 10R within the mounting bracket aperture 12PA permits the stop member 10RS to pivotally move beyond the element 12SR out of its path for properly positioning the arm rest 10. The stop member 12SR, however, is effective to prevent the stop member 10RS from being moved beyond the stop member 12SR and permit access to the enlarged segment 12PAI of the mounting apertures 12PA; see FIG. 3. For the purposes of removing the arm rest 10 from the bracket 12, however, the stop member 12SR may be pivoted out of the path of the stop member 10RS to allow it to move beyond the stop member and be slipped out of the mounting apertures 12PA. When the arm rest 10 and its associated mounting frame 14 are upholstered, this may be accomplished by inserting a sharp pointed object such as an ice pick, or the like, for moving the stop member 12SR upwardly out of the path of the stop member 10RS to allow the arm rest 10 to be readily removed from the bracket 12.

With the above structure in mind, the mounting and dismounting of the arm rest 10 can be better appreciated. The arm rest 10 can be readily mounted to the bracket 12 by sliding the tubular element 10R into the mounting apertures 12PA for the mounting bracket 12 with the stop member 10RS aligned with the enlarged segment 12PAI for the mounting aperture 12PA; set FIG. 5. This allows the mounting arm 10 to be readily mounted into the mounting apertures 12PA for securing it to the bracket 12. Once the arm rest 10 is so positioned within the bracket 12, it may be rotated in a counter-clockwise direction, moved beyond the stop member 12SR as a result of their interengagement and continuously rotated until it is rotated into engagement with stop member 12SF. In this relationship the arm 10 is held in the horizontal, arm-resting position as illustrated in FIGS. 1 and 2. The arm 10 in this relationship may be moved to a nonresting position by simply rotating the arm 10 clockwise to assume the vertical position illustrated in FIG. 3. The arm cannot travel beyond this vertical position in view of the interengagement of the stop element 10RS for the rotatable element 10R and the stop member 12SR for the bracket 12. The arm rest 10, however, may be freely moved between these two positions without any disengagement of the arm rest 10 from the mounting bracket 12. As previously indicated, to remove the arm rest 10, the stop member 12SR is pivoted out of the path of the rotatable element 10R and its stop 10RS. The position of the stop 12SR for this purpose is illustrated in FIG. 5 and is maintained in this position until the rotatable element 10R and the stop member 10RS are accommodated by the mounting apertures 12PA and the segments 12PAI. The manner of holding the stop 12SR in the elevated position of FIG. 5 is not illustrated. In this position, the arm rest 10 may be readily slipped out of the mounting bracket 12.

It should now be appreciated that the arm rest 10 and the bracket 12 may be utilized for mounting the arm rest as either a left-hand or a right-hand arm rest with the same bracket 12. The arm rest may be mounted to the bracket from either the right or the left side as desired.

What is claimed is:

1. An arm rest for a chair or the like comprising a rectangular arm having a preselected length, a tubular element secured adjacent one end of the arm and protruding therefrom, a stop member secured adjacent the free end of the tubular member and arranged to be in a parallel longitudinal alignment with the rectangular arm, and mounting means having an arm locking aperture for slidably receiving said tubular member and the stop member therein and rotatable therein, said mounting means including an integral stop member protruding a preselected distance into the locking aperture for engagment with said stop member of said tubular member to arrest the rotation of the stop member when the arm is rotated into engagement therewith to thereby support the arm in a substantially horizontal position for resting a human arm by means of said integral stop member.

2. An arm rest for a chair or the like as defined in claim 1 wherein said mounting means comprises a U-shaped bracket having its arm spaced apart a distance to allow the stop member for said tubular member to be freely rotated between the arms of the "U" for engaging the integral stop member and including a stop member pivotably secured between the arms of the "U" for restricted pivotal movement betwen the "U" and arranged in its normal position to arrest the rotation of said arm when it is rotated in a direction away from the substantially horizontal position afforded by said integral stop member and capable of being pivoted out of the path of the stop member.

3. An arm rest for a chair or the like comprising
an L-shaped element having the long arm of the "L" adapted as a rest for an individual's arm and the short arm of the L-shaped element being defined by a rotatable element having a stop member secured on the outer surface of the element adjacent the free end thereof, the stop member being located for maintaining the long arm of the element in a horizontal position when arranged in an arm-resting relationship, and a U-shaped element having a pair of coaxial apertures constructed and defined in the parallel arms of the U-shaped element for slidably receiving said rotatable element and the stop member, said apertures having a segment corresponding only to the outer configuration of the rotatable element at the stop member for slidably receiving said rotatable element therein, the parallel arms of the U-shaped element being spaced apart a distance for permitting the rotatable element to be rotated in said apertures with the stop member being freely rotated between the parallel arms once received therein, the arm connecting the parallel arms of the U-shaped element having a stop member adapted for extending inwardly between the parallel arms for engaging the stop member on the tubular element at a location for holding the L-shaped element in the horizontal, arm-resting position.

4. An arm rest for a chair or the like as defined in claim 3 wherein said U-shaped element includes stop means secured thereto and spaced from the stop member on the element for permitting the rotatable element to be rotated away from the stop member so as to position and hold the L-shaped element in a substantially vertical, nonresting position.

5. An arm rest for a chair or the like as defined in claim 3 wherein said stop member is integrally formed from the U-shaped element by deforming the connecting arm of the U-shaped element and securing it in the selected deformed position.

6. An arm rest for a chair or the like as defined in claim 3 wherein each of the coaxial apertures for the U-shaped element have a circular configuration with a segment of increased diameter for slidably receiving the rotatable element and the stop member thereof for mounting the L-shaped element to the U-shaped element.

7. An arm rest for a chair or the like as defined in claim 6 including a member pivotably secured between the parallel arms of the U-shaped element and adjacent the segment of increased diameter, the member being pivotable out of the path of the stop member for the rotatable element when said element and its stop member are rotated out of said segment in a direction toward the pivotal member and functioning as a stop to prevent said element from being rotated in the opposite direction beyond the pivotal member to thereby rotatably secure the L-shaped element to the U-shaped element.

8. An arm rest for a chair or the like as defined in claim 7 wherein the long arm of the L-shaped element has a rectangular cross-section and said rotatable element is a tubular element having a stop member of a preselected configuration welded thereto.

9. A mounting bracket for a rotatable element or the like comprising
a U-shaped element having a pair of coaxial apertures constructed and defined in the parallel arms of the U-shaped element for slidably receiving an element to be mounted therein, said apertures having a configuration corresponding with the outer profile of the element to be mounted to allow the element to be slidably received in the apertures and to be controllably moved therein, the arm connecting the parallel arms of the U-shaped element including a stop member extending inwardly thereof between the parallel arms and adjacent the coaxial apertures for coaction with an element held in the apertures for stopping the movement of the mounted element and holding it in a preselected position, a second stop element pivotably secured between the parallel arms of the U-shaped element and positioned thereon at a location relative to said first-mentioned stop member for coaction with the element mounted and held in the apertures for stopping the element in a position at approximately 90 degrees to said preselected position and being pivotable out of the path of the element held therein.

10. A mounting bracket as defined in claim 9 wherein said pivotal stop element is pivotably secured to the parallel arms of the U-shaped element for pivotal movement therebetween.

11. A mounting bracket as defined in claim 10 wherein said pivotal stop element has a T-like configuration, the parallel arms of the U-shaped element having a pair of coaxial apertures for securing the outer ends of the T-stop element and yet permitting restricted pivotal movement of the tongue of the T-stop element between said parallel arms.

12. A mounting bracket as defined in claim 11 wherein said coaxial apertures have a circular configuration with a segment of enlarged diameter, the wall of said segment being inclined inwardly towards the interior of the U-shaped element.

13. A mounting bracket for mounting an arm rest for a chair, seat or the like comprising
a U-shaped mounting element having a pair of coaxial apertures constructed and defined in the parallel arms of the U-shaped element for slidably receiving an element to be rotatably mounted therein, said element to be mounted therein carrying a rotation arresting element on the outer surface thereof, said apertures having a configuration corresponding with the outer profile of the element to be rotatably mounted therein for permitting the element to be slidably received along with its arresting element only at a preselected location thereof and to be rotated therein with the arresting element moving between the parallel arms of the U-shaped element, said U-shaped element having a stop member arranged for engaging the rotation arresting element for arresting the rotation thereof and supporting the element in a substantially horizontal, arm resting position and a second stop member thereof pivotably arranged on the U-shaped element for engaging the rotation arresting element when it is rotated back from said arm resting position to a substantially, vertical position, said second stop member being movable out of the path of the rotation arresting element for permitting the element mounted in the U-shaped element to be removed therefrom.

14. A mounting bracket for mounting an arm rest for a chair, seat or the like as defined in claim 13 wherein said apertures are of a circular configuration with a segment of increased diameter to accommodate the rotation arresting element.

15. A mounting bracket for mounting an arm rest for a chair, seat or the like as defined in claim 14 wherein said first-mentioned stop member is arranged adjacent the circular portions of said apertures and said second stop member being arranged adjacent said segments for said apertures at a location approximately diametrically opposite the location of the first-mentioned stop member.

* * * * *